Figure 1:
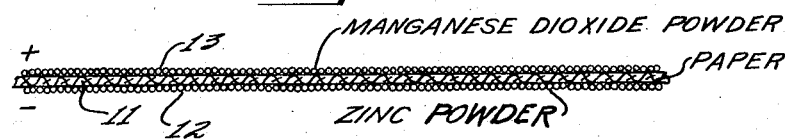

Feb. 1, 1955

I. REINER 2,701,272

DRY CELL BATTERY

Filed May 27, 1952

INVENTOR
*Irving Reiner*
BY
ATTORNEY

United States Patent Office 2,701,272
Patented Feb. 1, 1955

2,701,272

DRY CELL BATTERY

Irving Reiner, New York, N. Y.

Application May 27, 1952, Serial No. 290,168

9 Claims. (Cl. 136—111)

This invention relates to a simple primary dry cell, and particularly to a primary cell of the "flat type," comprising a thin sheet or disc serving as a separator for the electrodes which are applied as a coating to each side of the sheet or disc.

More particularly, the invention relates to a dry cell battery, especially adapted for open-circuit or intermittent duty, comprising a multiplicity of my improved primary cells arranged as a voltaic pile to form a compact, long-life impulse delivering member of relatively high potential or electromotive force capable of delivering a maximum charge per unit of length.

The battery of the present invention is particularly suitable for use where it is desired to provide a source of electrical power capable of delivering high potential electrical impulses or static charges of electricity to a conductor, rather than to provide a substantial current output at a relatively high and sustained potential through an external circuit containing a load.

The invention therefore may be used to special advantage in mechanisms requiring a source of motive power to apply intermittent impulses to a movable part, such as an oscillating member, especially where the forces of deceleration acting upon the oscillating member are relatively small. Typical of such oscillating members are pendulums, of either the swinging or the torsion type.

Exemplifying a particularly advantageous use for the improved dry cell battery, though by no means limited thereto, reference may be had to my copending application Serial No. 248,762, filed September 28, 1951, for an Electric Clock, now Patent No. 2,625,787, of which the present application is a continuation-in-part. The copending application discloses a preferred form, composition, and method of making my improved primary cell, and a spaced pair of series-connected multiple-cell batteries presenting opposite poles for the purpose of delivering intermittent electrostatic impulses to an oscillating member at each end of its path of oscillation. The impulses are mechanically transmitted to the clock pendulum, and are of sufficient magnitude to compensate for the frictional, gravitational, or other forces which tend to decelerate the movement of the pendulum.

While dry cell batteries have heretofore been employed as a motive force for actuating a clock mechanism, they have generally activated movable members by the intermittent application of electromagnetic impulses, thus requiring a relatively high current output. Batteries suitable for such type of duty are usually characterized by a relatively low internal resistance in order that a maximum current may be made to flow through the external load. As a result of high current output, polarization tends to occur within the cell and, unless remedied by the presence of a suitable depolarizer, lowers the voltage which the cell can give and increases the internal resistance. In contradistinction to the foregoing, electrostatic impulses may be delivered with practically negligible current output, provided the terminal potential is sufficiently high, thus permitting the use of a dry cell battery lacking the space-consuming depolarizing agents normally employed.

In accordance with the present invention, I provide a simple primary cell of exceptional durability and extremely high internal resistance by coating the opposite sides of a thin flat sheet of hygroscopic material, such as paper, with the metals, in finely-divided or powder form, which are to form the terminal elements of the cell. Primarily, the sheet of hygroscopic material forms a support for the powdered metallic elements comprising the cell, and is only of sufficient thickness to maintain the minimum practicable spacing of the terminal elements, short of their actual physical contact. A readily oxidizable substance, that is, one which will readily lose electrons, is applied to one side of the sheet of hygroscopic material to form the anode of the battery, and a readily reducible substance, that is, one which will readily gain electrons, is applied to the opposite side of the sheet to form the cathode of the battery. The powdered metallic elements are firmly secured to the sheet of hygroscopic material by a suitable bonding material which, upon drying, will retain a minimum amount of moisture, that is, an amount insufficient to cause rapid deterioration of the cell. In order to form a pile or battery of high terminal potential, a plurality of such flat coated sheets may be superimposed with the anode surface of one cell contiguous to the cathode surface of the next adjacent cell, the pile of superimposed elements being pressed together and encased within an elongated housing or container. The container or shell of the battery is not only sealed to prevent the admission of any substantial amount of moisture, but also is formed of such material as will minimize moisture condensation or absorption on its exposed surfaces, thereby precluding a short circuit of the battery as a result of moisture pick-up from the air. A terminal post in contact with an end element of the pile, and projecting from the closure member at the corresponding end of the housing, provides the surface of high potential which is to deliver the electrostatic charge.

In one preferred embodiment of the invention, the individual primary cells are formed by coating flat circular discs of extremely thin tissue paper on the one side with zinc dust, and on the other side with manganese dioxide dust, the bonding of the powdered metallic elements being accomplished by first coating the tissue paper disc with a suitable adhesive, such as mucilage, starch, etc. In order to form a pile having a terminal potential of sufficient electromotive force to impart a substantial charge to a conductor, a plurality of such primary cells, in the order of about five hundred to several thousand, are superimposed in a series-connected pile containing several hundred cells to the inch, and are housed within a cylindrical tube of non-porous material, such as polystyrene, which is resistant to surface wetting as a result of moisture condensation from the atmosphere. In order to impart electrostatic charges to an oscillating conductor at each end of a path of oscillation extending between two horizontally spaced points, two such batteries may be provided as impulse-delivering members, one with the zinc-coated surfaces facing upward, and the other with the manganese dioxide surfaces so faced. The lower ends of the battery piles are connected by a suitable conductor, so that the upper ends may have terminal voltages of opposite charge equal to the combined voltages of the two batteries or piles.

Figure 2:
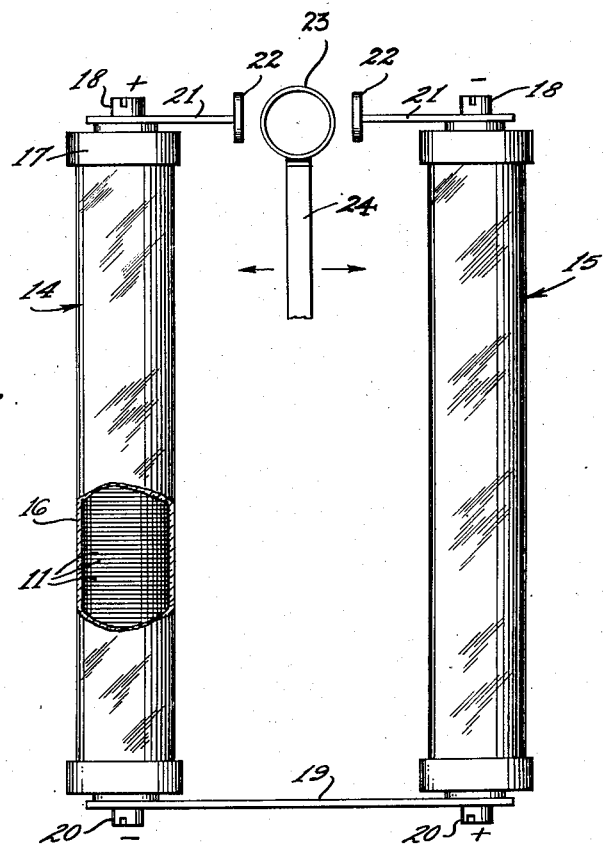

For a fuller understanding of the invention, reference may be had to the following description and claims taken in connection with the accompanying drawing forming a part of this application, in which:

Fig. 1 shows an enlarged, fragmentary portion of the primary cell in elevational cross section, the complete cell of this embodiment being a flat disc having a high ratio of diameter to thickness; and Fig. 2 is an elevational view, in partial section, showing a pair of series connected batteries, each consisting of many superimposed primary cells, arranged to provide horizontally-spaced terminal elements of opposite polarity, each at a potential of such magnitude as to be capable of imparting substantial charges of opposite polarity to a conductor diagrammatically illustrated as oscillating along a path extending between the terminal elements.

Referring to Fig. 1 of the drawing, the numeral 11 refers to a fragmentary portion of an individual disc cut from a thin sheet of tissue paper or other suitable hygroscopic material containing only a relatively slight amount of moisture. A readily oxidizable substance, such as zinc, in the form of finely-divided powder is applied as a thin layer 12 to one surface of the paper, and a layer 13 of a readily reducible substance, such as manganese dioxide, is similarly applied to the opposite side of the paper. Bonding to the paper is accomplished by the use of mucilage, dextrin, etc., or other known substances which are only slightly hygroscopic. The manganese dioxide and the zinc form, respectively, the cathode and the anode of a primary cell.

No moisture, other than that which may be retained in the bonding material after drying, or is hygroscopically absorbed in the tissue paper, is added to the cell during fabrication. On the contrary, precautions are taken at such time, and during subsequent use of the battery, to exclude any extraneous moisture. Substantially the only liquid which is in any way available as an electrolyte of the cell is such moisture as may be contained in the relatively dry tissue paper.

Since there is substantially no liquid within the simple primary cell, and since the cell is not intended for high current output, the usual depolarizer, in the form of a readily oxidizable substance, which is employed in dry cell batteries of high liquid content may be dispensed with.

Contrary to the general practice of employing manganese dioxide in dry cells solely for the purpose of acting as a depolarizer, that is, for the purpose of removing the bubbles of hydrogen that tend to coat the positive plate or terminal, I employ manganese dioxide as the positive element or cathode of the cell. Depolarization in the usual sense is not required, since there is substantially no liquid electrolyte.

As stated, the battery of the present invention is not intended to deliver current through a closed circuit, but is intended merely to impart alternate positive and negative electric charges or impulses to an insulated oscillating conductor which is not at any time in circuit with the battery. Thus, polarization, which would tend to temporarily paralyze the cell, is not a serious factor to be contended with during use of the cell.

In order for the cell to develop its terminal potential there is necessarily a transformation of chemical energy into electrical energy. The ionization that makes possible such transformation apparently comes from the moisture hygroscopically contained within the pores of the tissue paper and the salts naturally present in minute quantity within the fibres of the tissue paper.

Contrary to the action which takes place within dry cells of the type heretofore generally employed, that is, a gradual deterioration of the negative plate, such as a zinc cylinder, without any appreciable deterioration of the positive plate, such as a carbon rod, the chemical reaction necessarily occurring within the cell of the present invention causes deterioration of both elements. The zinc anode is gradually oxidized, and the manganese dioxide, in giving up a portion of its oxygen, exhausts itself. Apparently, the manganese dioxide is reduced to another oxide of the metal.

Since the battery has an extremely high internal resistance, and is intended only to impart an electrical charge or impulse rather than to discharge a current through an external circuit, the rate of deterioration of the zinc and manganese dioxide is so slow as to be almost insignificant for all practical purposes.

Referring to Fig. 2, a multiplicity of the simple cells of Fig. 1 are shown in the form of a pile or battery, two being shown side-by-side and generally indicated by the numerals 14 and 15. Each pile comprises several thousand of the simple primary cells, placed one on top of the other within a cylindrical member or tube 16 composed of material, such as polystyrene, which does not absorb moisture and is not susceptible to surface condensation of moisture in the air.

The tubes 16 are capped at each end by members 17, and the discs are firmly pressed together by any suitable means. A terminal post 18 projects from the upper end of each battery. Battery 14 has its manganese dioxide-coated surfaces or positive plates facing upward, and its post 18 is therefore positively charged. Battery 15 has its zinc-coated surfaces or negative plates facing upward, and its post 18 is therefore negatively charged. The batteries 14 and 15 are joined in series by a conductor 19 connecting their lower terminal posts 20.

The upper terminal posts 18 are of opposite polarity, as indicated, and each is provided with a conductor 21 terminating in a contact member 22. The contact members 22 are spaced horizontally to provide a region therebetween adapted to receive an oscillating conductor.

The oscillating conductor is shown in the form of a cylinder 23 of conductive material supported on a movable arm 24 which is insulated therefrom in known manner. Arm 24 may be mechanically connected to any movable element which is to receive the intermittent impulses resulting from the transfer of electric charges from the fixed contacts 22 to the oscillating cylinder 23 at each end of its path of movement.

It is characteristic of the invention that at no time is there any closed circuit between the impulse delivering members or batteries. The cylinder 23 merely travels back and forth carrying electric charges between the battery contacts 22, which charges, being electrostatic, reside only on the outside surface of the cylinder.

It is to be noted that each time the cylinder picks up a charge there are two forces simultaneously brought into play, which urge it toward the opposite terminal. It is both repelled by the terminal from which it has received its charge, by reason of the similarity of charges, and is attracted toward the terminal of opposite polarity, by reason of a dissimilarity of charges.

The novel battery of the present invention is capable of various applications other than that of providing the activating force for a clock pendulum, as disclosed in my copending application Serial No. 248,762. It is also susceptible of various modifications within the spirit of my invention. For example, it is contemplated that elements other than zinc may be employed as the negative element of the battery. Other elements having a relatively high single electrode positive potential will suggest themselves to those skilled in the art. Likewise, elements other than manganese dioxide may be used as the positive element, for example: copper oxide, chromium oxide, or other elements having a less positive or a negative potential.

It is also to be understood that, where necessary, the zinc may be amalgamated in known manner to overcome local action within the cell as a result of the presence of carbon impurities in the zinc.

In a preferred embodiment of the invention it is contemplated that sufficient individual primary cells will be piled in each battery to provide a source capable of delivering at least 250 volts, and preferably about 1000–2000 volts. Thus, when two such batteries are connected in series, as shown, the terminal voltage of each contact will be in the order of about 2000–4000 volts.

It is also contemplated that the cells will be of such thickness as to enable about 200–300 of the elements to be piled within one inch.

It will be obvious from the foregoing that I have provided a highly efficient, compact, and durable battery for delivering electrical impulses, which battery is of such potential per unit of length as to be capable of delivering a charge of at least 50 volts per inch of length, and preferably a charge in the order of about 200–300 volts per inch of length.

Since it will be readily apparent to those skilled in the art that the invention is susceptible to various modifications and improvements within the scope of the invention, and is not limited to the particular application thereof disclosed, I desire that only such limitations be placed thereon as are specifically set forth in the appended claims.

What is claimed is:

1. A primary cell comprising a relatively-thin sheet of hygroscopic material forming an electrode support and the sole source of electrolyte, a thin layer of manganese dioxide in the form of finely-divided powder applied by a bonding agent to one face of said sheet to form the positive electrode of said cell, and a thin layer of zinc in the form of finely-divided powder applied by a bonding agent to the opposite face of said sheet to form the negative electrode of said cell.

2. A primary cell as defined in claim 1, in which said relatively-thin sheet comprises cellulose containing only a slight amount of hygroscopically adsorbed moisture as the electrolytic material.

3. A primary cell as defined in claim 1, in which said hygroscopic material is a tissue paper, and said bonding agent is dextrin.

4. A primary cell comprising a relatively-thin sheet of hygroscopic material adapted to form an electrode support and to provide the sole source of electrolyte for said cell, a thin layer of readily reducible material applied as a bonded coating to one face of said sheet to form the positive electrode of said cell, and a thin layer of readily oxidizable material applied as a bonded coating to the opposite face of said sheet to form the negative electrode of said cell, said cell being free of any added electrolyte or any added depolarizing material and being characterized by extremely high internal resistance.

5. A dry cell battery comprising a plurality of flat primary cells arranged in a series-connecting pile, each of said cells having a thin sheet of hygroscopic material as a support and the sole source of electrolyte, a thin layer of readily reducible material bonded to one face of said sheet to form the positive plate, and a thin layer of readily oxidizable material bonded to the opposite face of said sheet to form the negative plate; a tubular member containing said pile, said tubular member being formed of a substance not readily susceptible to wetting as a result of moisture condensation from the atmosphere; and closure members at the ends of said tubular member adapted to press firmly against the opposite ends of said pile, said closure members having a conductor extending therefrom to provide at least one charge-delivering surface.

6. A dry cell battery as defined in claim 5, in which said reducible material is finely-divided manganese dioxide, said oxidizable material is finely-divided zinc, and said hygroscopic material is a sheet of tissue paper having a minimum thickness.

7. A dry cell battery as defined in claim 6, in which said pile contains about 1000 to 2000 of said flat primary cells.

8. A battery adapted to deliver high-potential electrostatic charges from a spaced pair of conductors comprising a parallel pair of primary cell piles connected in series and having their opposite end poles connected to said conductors, said piles comprising a plurality of primary cell elements having a thickness in the order of about 15 to 25 thousandths of an inch, and being superimposed upon each other to form an electrical impulse-delivering member capable of delivering at least 250 volts, and being of such potential per unit of length as to be capable of delivering a charge of at least 50 volts per inch of length.

9. A battery as defined in claim 8, in which said impulse-delivering members are capable of delivering about 1000 to 2000 volts, and are at such potential per unit of length as to be capable of delivering a charge of about 100 to 200 volts per inch of length.

References Cited in the file of this patent

UNITED STATES PATENTS

| | | |
|---|---|---|
| 1,401,671 | Chubb | Dec. 27, 1921 |
| 1,549,371 | Myers et al. | Aug. 11, 1925 |
| 1,891,206 | Ruben | Dec. 13, 1932 |
| 1,920,151 | Ruben | July 25, 1933 |
| 2,463,565 | Ruben | Mar. 8, 1949 |

FOREIGN PATENTS

| | | |
|---|---|---|
| 700,818 | France | Mar. 7, 1931 |